United States Patent
Dong et al.

(10) Patent No.: US 9,559,854 B2
(45) Date of Patent: Jan. 31, 2017

(54) MANAGING RENDEZVOUS POINT REDUNDANCY IN A DYNAMIC FABRIC NETWORK ARCHITECTURE

(71) Applicant: Cisco Technology, Inc., San Jose, CA (US)

(72) Inventors: Liqin Dong, San Jose, CA (US); Yibin Yang, San Jose, CA (US); Xinggang Zhou, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 14/312,347

(22) Filed: Jun. 23, 2014

(65) Prior Publication Data

US 2015/0372827 A1     Dec. 24, 2015

(51) Int. Cl.
  *G01R 31/08* (2006.01)
  *H04L 12/18* (2006.01)
  *H04L 12/24* (2006.01)
  *H04L 12/801* (2013.01)
(52) U.S. Cl.
  CPC ........... *H04L 12/18* (2013.01); *H04L 12/1886* (2013.01); *H04L 41/0654* (2013.01); *H04L 47/12* (2013.01); *H04L 41/0843* (2013.01)
(58) Field of Classification Search
  CPC ....... H04L 12/18; H04L 47/12; H04L 41/0654
  USPC ........................................ 370/216, 229, 390
  See application file for complete search history.

(56) References Cited

U.S. PATENT DOCUMENTS

| | | | |
|---|---|---|---|
| 8,391,185 B2 | 3/2013 | Wijnands et al. | |
| 8,488,616 B2 | 7/2013 | Wijnands et al. | |
| 2003/0193958 A1 | 10/2003 | Narayanan | |
| 2006/0182049 A1 | 8/2006 | Rokui | |
| 2009/0310513 A1 | 12/2009 | Sen et al. | |
| 2012/0076067 A1 | 3/2012 | Yao et al. | |
| 2014/0355450 A1* | 12/2014 | Bhikkaji | H04L 47/125 370/237 |

OTHER PUBLICATIONS

CISCO, Bidirectional PIM Deployment Guide, Feb. 2008. (From Applicant's IDS filed on Jun. 23, 2014).*
CICSO, Bidirectional PIM Deployment Guide, Deployment Guide, Feb. 2008, Cisco Systems, Inc., San Jose, United States.
(Continued)

*Primary Examiner* — Mang Yeung
(74) *Attorney, Agent, or Firm* — Patterson + Sheridan LLP

(57) ABSTRACT

Multi-destination frames in a network fabric may be carried in IP multicast packets. As such, the network fabric may us IP multicast technique such as a PIM protocol for handling the multi-destination frames. To provide redundancy, the system administrator can use phantom rendezvous points (RPs) that include multiple physical RPs where one of the RPs serves as a primary RP and the other RPs serve as secondary RPs (e.g., backup RPs). Instead of the system administrator manually configuring the phantom RPs, the RPs are automatically configured. To do so, the system administrator may use a GUI to provide multicast groups allocated for the multi-destination traffic, the number of desired phantom RPs (or physical RPs), and the desired RP redundancy. Based on these parameters, a data center manager generates one or more templates that automatically configure the network devices in the fabric as they are booted.

19 Claims, 9 Drawing Sheets

(56) References Cited

OTHER PUBLICATIONS

Bista, Bhed Bahadur et al., An Efficient RP (Rendezvous Point) Replacement Mechanism for Rendezvous-based Multicast Routing, Proceedings of the 23rd International Conference on Distributed Computing Systems, May 19, 2003, 6 pages, IEEE, Piscataway, United States.

Kim, Dorian et al., Using MSDP to create Logical RPs, IETF Tools, Mar. 1999, 8 pages, <https://tools.ietf.org/html/draft-ietf-mboned-logical-rp-00>.

International Search Report and Written Opinion, International Application No. PCT/US2015/035991, dated Sep. 11, 2015, 14 pages.

* cited by examiner

GENERATED PHANTOM RPs

| | PHANTOM RP 1.1.1.2 | PHANTOM RP 1.2.1.2 | PHANTOM RP 1.3.1.2 | PHANTOM RP 1.4.1.2 | PHANTOM RP 1.5.1.2 |
|---|---|---|---|---|---|
| SPINE NETWORK DEVICE 315A | LB 1.1.1.1 WITH MASK = 29 | LB 1.2.1.1 WITH MASK = 28 | LB 1.3.1.1 WITH MASK = 27 | | |
| SPINE NETWORK DEVICE 315B | | LB 1.2.1.1 WITH MASK = 29 | LB 1.3.1.1 WITH MASK = 28 | LB 1.4.1.1 WITH MASK = 27 | |
| SPINE NETWORK DEVICE 315C | LB 1.1.1.1 WITH MASK = 27 | | LB 1.3.1.1 WITH MASK = 29 | LB 1.4.1.1 WITH MASK = 28 | LB 1.5.1.1 WITH MASK = 27 |
| SPINE NETWORK DEVICE 315D | LB 1.1.1.1 WITH MASK = 28 | | | LB 1.4.1.1 WITH MASK = 29 | LB 1.5.1.1 WITH MASK = 28 |
| SPINE NETWORK DEVICE 315E | | LB 1.2.1.1 WITH MASK = 27 | | | LB 1.5.1.1 WITH MASK = 29 |

SELECTED PHYSICAL RPs

|  | PHANTOM RP 1.1.1.2 | PHANTOM RP 1.2.1.2 | PHANTOM RP 1.3.1.2 | PHANTOM RP 1.4.1.2 | PHANTOM RP 1.5.1.2 |
|---|---|---|---|---|---|
| SPINE NETWORK DEVICE 315A | LB 1.1.1.1 WITH MASK = 29 | LB 1.2.1.1 WITH MASK = 28 | LB 1.3.1.1 WITH MASK = 27 | | |
| SPINE NETWORK DEVICE 315B | | LB 1.2.1.1 WITH MASK = 29 | LB 1.3.1.1 WITH MASK = 28 | LB 1.4.1.1 WITH MASK = 27 | |
| SPINE NETWORK DEVICE 315C | LB 1.1.1.1 WITH MASK = 27 | | LB 1.3.1.1 WITH MASK = 29 | LB 1.4.1.1 WITH MASK = 28 | LB 1.5.1.1 WITH MASK = 27 |
| SPINE NETWORK DEVICE 315D | | LB 1.2.1.1 WITH MASK = 27 | | LB 1.4.1.1 WITH MASK = 29 | LB 1.5.1.1 WITH MASK = 28 |
| SPINE NETWORK DEVICE 315E | LB 1.1.1.1 WITH MASK = 30 | | | | LB 1.5.1.1 WITH MASK = 29 |

FIG. 8

| | GENERATED PHANTOM RPs | | | | |
|---|---|---|---|---|---|
| | PHANTOM RP 1.1.1.2 | PHANTOM RP 1.2.1.2 | PHANTOM RP 1.3.1.2 | PHANTOM RP 1.4.1.2 | PHANTOM RP 1.5.1.2 |
| SPINE NETWORK DEVICE 315A | LB 1.1.1.1 WITH MASK = 29 | LB 1.2.1.1 WITH MASK = 28 | LB 1.3.1.1 WITH MASK = 27 | | |
| SPINE NETWORK DEVICE 315B | | LB 1.2.1.1 WITH MASK = 29 | LB 1.3.1.1 WITH MASK = 28 | LB 1.4.1.1 WITH MASK = 27 | |
| SPINE NETWORK DEVICE 315C | | | LB 1.3.1.1 WITH MASK = 29 | LB 1.4.1.1 WITH MASK = 28 | LB 1.5.1.1 WITH MASK = 27 |
| SPINE NETWORK DEVICE 315D | LB 1.1.1.1 WITH MASK = 28 | | | LB 1.4.1.1 WITH MASK = 29 | LB 1.5.1.1 WITH MASK = 28 |
| SPINE NETWORK DEVICE 315E | LB 1.1.1.1 WITH MASK = 27 | LB 1.2.1.1 WITH MASK = 27 | | | LB 1.5.1.1 WITH MASK = 29 |

SELECTED PHYSICAL RPs

OVERLOADED RP 1005
1010
1015
1000

FIG. 10

MANAGING RENDEZVOUS POINT REDUNDANCY IN A DYNAMIC FABRIC NETWORK ARCHITECTURE

TECHNICAL FIELD

Embodiments presented in this disclosure generally relate to handling multi-destination traffic in a network fabric. More specifically, embodiments disclosed herein establish and manage rendezvous points with shared trees for routing the multi-destination traffic.

BACKGROUND

Bidirectional Protocol Independent Multicast (Bidir PIM) is a member of the suite of multicast routing protocols which also includes dense-mode, sparse-mode, and source specific multicast (SSM). Bidir PIM was developed to help deploy emerging communication and financial applications that rely on a many-to-many applications model. Bidir PIM allows these applications to easily scale to a very large number of groups and sources by eliminating the maintenance of source states.

Traditional PIM protocols (dense-mode and sparse-mode) provided two models for forwarding multicast packets: source trees, and shared trees. Source trees are rooted at the source of the traffic while shared trees are rooted at the rendezvous point. Each model has its own set of characteristics and can be optimized for different types of applications. The source tree model provides optimum routing in the network, while shared trees provide a more scalable solution. Source trees achieve the optimum path between each receiver (or recipient) and the source at the expense of additional routing information such as a routing entry per source in the multicast routing table. This is acceptable in applications with a limited number of sources. Applications like live broadcasts and distance learning are some examples where only one or a few sources are active. On the other hand, the shared tree provides a single distribution tree for all of the active sources. This means that traffic from different sources traverse the same distribution tree to reach the interested receivers, thereby reducing the amount of routing states in the network. Bidir PIM (a variant of PIM sparse-mode) uses these shared trees as its main forwarding mechanism.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 illustrates a network fabric configuration chart that includes multiple phantom rendezvous points, according to one embodiment described herein.

FIG. 8 illustrates a network fabric configuration chart that includes a changed mask value relative to the chart illustrated in FIG. 6, according to one embodiment described herein.

FIG. 10 illustrates a network fabric configuration chart that includes a changed mask value for an overloaded rendezvous point, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
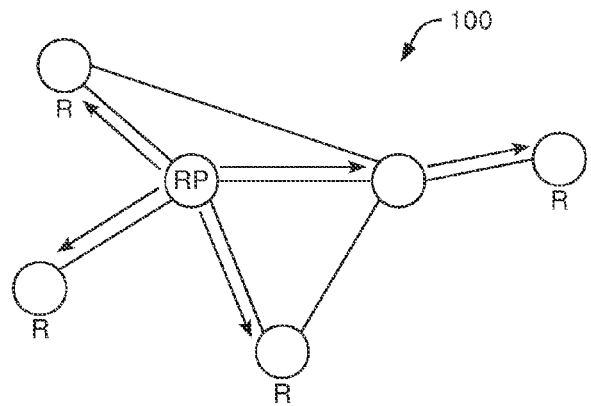
FIG. 1 illustrates a rendezvous point and a corresponding shared tree in a network fabric, according to one embodiment described herein.

One embodiment presented in this disclosure is a method for generating one or more templates for configuring a network device in a network fabric. The method includes receiving parameters for establishing phantom rendezvous points (RPs) in the network fabric and apportioning a plurality of multicast groups among the phantom RPs. The method also includes establishing, based on the parameters, at least one primary RP and secondary RP for each of the phantom RPs using different values for respective subnet masks and generating one or more templates based on the apportioning and establishing steps. When the network device is added to the network fabric, the templates may be used to configure the network device to perform multicast packet routing.

Another embodiment presented in this disclosure is a computer program product for generating one or more templates for configuring a network device in a network fabric. The computer program product includes computer code that receives parameters for establishing phantom RPs in the network fabric and apportions a plurality of multicast groups among the phantom RPs. The computer program product also includes computer code that establishes, based on the parameters, at least one primary RP and secondary RP for each of the phantom RPs using different values for respective subnet masks and generates one or more templates based on the apportioning and establishing. When the network device is added to the network fabric, the templates may be used to configure the network device to perform multicast packet routing.

One embodiment presented in this disclosure is a method for establishing multicast packet routing in a network fabric. The method includes configuring, using one or more templates, a plurality of network devices to perform multicast packet routing when the network devices are added to the network fabric where the templates are based on parameters for establishing phantom RPs in the network fabric. After configuring the plurality of network devices using the one or more templates, a plurality of multicast groups are apportioned among the phantom RPs and each phantom RP has a primary RP and a secondary RP based on different values of respective subnet masks. The method includes receiving multi-destination traffic in the network fabric and forwarding the multi-destination traffic to at least one primary RP based on a multicast group assigned to the multi-destination traffic.

Example Embodiments

Multi-destination frames in a network fabric may be encapsulated in UDP/IP multicast packets. The network fabric may use an IP multicast technique such as a PIM protocol for forwarding the multi-destination frames encapsulated in the IP packets. As used herein, multi-destination traffic may include broadcast traffic, multicast traffic, and unicast traffic with an unknown destination.

Virtual Extensible LAN (VXLAN) is a network virtualization technology that ameliorates the scalability problems associated with large cloud computing deployments. VXLAN uses a VLAN-like encapsulation technique to encapsulate layer 2 Ethernet frames with layer 3 UDP/IP packets. VXLAN encapsulates customer frames with a VXLAN header and used UDP/IP packets to transport the frames. The VXLAN header contains a VXLAN segment ID or VXLAN network identifier, which is a 24-bit field to identify virtual network segments assigned to different customers or tenants. The multi-destination frames in VXLAN are encapsulated in IP multicast packets which use multicast group addresses as destination IP addresses. A multicast group address can be assigned to one VXLAN segment (i.e., one particular value of the 24-bit header) or shared among multiple VXLAN segments. In one embodiment, in order to route the IP multicast packets which include the multi-destination frames, the network fabric uses a PIM protocol such as bidir PIM.

As discussed above, bidir PIM may include shared trees that are tasked with routing the multi-destination traffic to the appropriate destinations in the network fabric. To do so, the system administrator may set up one or more network devices that serve as rendezvous points (RPs) for the shared trees. Moreover, to provide redundancy, the system administrator can use phantom RPs that include multiple physical RPs where one of the RPs serves as a primary RP and the other RPs serve as secondary RPs (e.g., backup RPs). Instead of the system administrator manually configuring the phantom RPs and assigning the different multicast groups to the phantom RPs, the embodiments herein describe a technique for automatically configuring the network fabric. For example, the system administrator may use a graphical user interface (GUI) to provide multicast groups allocated for the multi-destination traffic, the number of desired phantom RPs (or physical RPs), and the desired RP redundancy (e.g., the number of secondary RPs in each phantom RP). Based on these parameters, a data center manager generates one or more templates used to automatically configure (i.e., without further user input) the network devices in the fabric as they are added to the network fabric.

In other embodiments, the network fabric may dynamically change a setting of the physical RPs after the network devices have been booted and the multicast traffic is flowing through the fabric. For example, when a primary RP fails, the multicast traffic is then sent to a secondary RP which causes a temporary traffic disruption. However, if the primary RP comes back online (e.g., after a reboot), the traffic will again be disrupted as the multicast traffic is rerouted to the primary RP. To prevent this additional traffic disruption, the network fabric promotes the previous secondary RP, which is currently the primary RP, to have a longer mask than the primary RP that failed. As such, even if the failed primary RP comes back online, the multicast traffic associated with the phantom RP continues to route to the previous secondary RP (i.e., the current primary RP). If desired, when network traffic is low (e.g., during a maintenance period) the original configuration for the phantom RP may be restored, and thus, any disruption to the multicast traffic is ameliorated.

Another example of dynamically changing a setting of the physical RPs is changing the priority of the secondary RPs for a particular phantom RP. Assuming a phantom RP has multiple secondary RPs (e.g., multiple RPs that backup the primary RP), if one of those secondary RPs is overloaded, the network fabric may change the priority amongst the secondary RPs so the overloaded RP is less likely to become the primary RP. For example, if the overloaded RP is currently the "next-in-line" if the primary RP fails, the network fabric may change the priority so that another secondary RP is the next-in-line. Thus, for the overloaded RP to become the primary RP, both the current primary RP and the next-in-line secondary RP must fail.

FIG. 1 illustrates a rendezvous point and a corresponding shared tree 100 in a network fabric, according to one embodiment described herein. Although FIG. 1 illustrates one shared tree, the network fabric 100 may used bidir PIM to establish multiple RPs that each have multiple shared trees 100. Each circle or node in the shared tree 100 represents a network device in the network fabric. A source device (not shown) forwards an IP multicast packet to the RP that corresponds to the multicast group ID. That is, each multicast group is assigned to a RP. Once the multicast packet is received, the RP evaluates the multicast address in the packet and selects which shared tree 100 should be used. Depending on which shared tree 100 is used determines the receipts (labeled as "r") of the multicast packet. The arrows in FIG. 1 illustrate the dissemination of the multicast packet to each of the receipts in the shared tree 100. Each multicast address may specify a unique shared tree 100 or multiple addresses may correspond to the same shared tree 100. By establishing the shared tree 100, bidir PIM provides a mechanism for routing IP multicast packets to the corresponding recipients in a network fabric.

Using bidir PIM in a VXLAN environment means that multi-destination traffic encapsulated in an IP multicast packet may be routed using the various RPs and shared trees in the network fabric. For example, as multi-destination traffic is received by a network device in the fabric, the network device encapsulates the multi-destination traffic into an IP multicast packet and selects a multicast group ID allocated to the multi-destination traffic. Based on the group ID, the network device that received the multi-destination traffic forwards the IP multicast packet to the corresponding RP which then selects the appropriate shared tree 100. In this manner, the multi-destination traffic is forwarded to the intended recipients.

Figure 2:
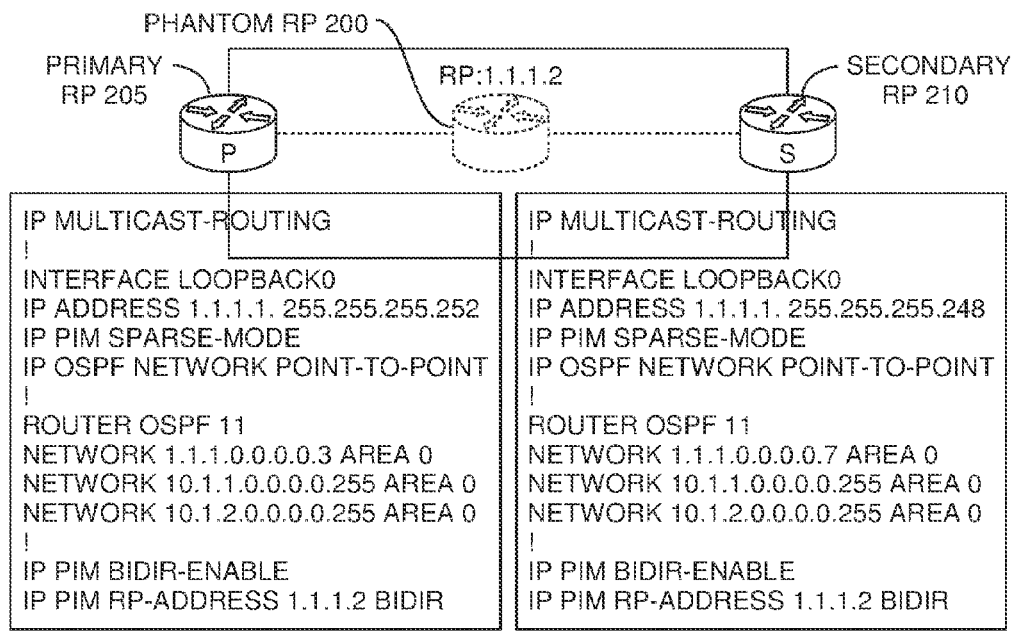
FIG. 2 illustrates primary and secondary rendezvous points associated with a phantom rendezvous point, according to one embodiment described herein.

FIG. 2 illustrates a primary and secondary RPs associated with a phantom RP, according to one embodiment described herein. To provide redundancy, the bidir PIM protocol permits the use of phantom RPs which are logical RPs that do not directly correspond to a physical network device. Instead, the phantom RPs use an IP address belonging to a particular subnet, but one that is not associated with any physical interface. As shown in FIG. 1, phantom RP 200 is assigned IP address 1.1.1.2. In this example, the phantom RP 200 includes a primary RP 205 (labeled "P") and a secondary RP 210 (labeled "S"). Unlike phantom RP 200, the primary and second RPs 205, 210 do correspond to a physical interface on a physical network device.

The primary and secondary RPs 205, 210 both have loopback interfaces that are assigned IP addresses within the same subnet as the IP address of the phantom RP 200 but with different subnet masks. As shown, the IP address for the primary RP 205 is 1.1.1.1 255.255.255.252 and the IP address for the secondary RP 210 is 1.1.1.1 255.255.255.248. In this disclosure, the mask values are referenced in a shorthand by the number of ones in the binary representation of the subnet mask values. Thus, the mask value 255.255.255.252 is 30 (i.e., has 30 binary ones) while 255.255.255.248 is 29 (i.e., has 29 binary ones). This configuration implements "unicast routing longest match route lookups" to guarantee a consistent path to the RP. In this case the RP address is still a "phantom" address (that is, it is not associated with any physical entity). It is only necessary to ensure that a route to the RP exists to maintain RP reachability which is done by employing loopback interfaces in the primary and secondary RPs 205, 210 with different subnet mask lengths. Both the primary and secondary RPs 205, 210 advertise routes for the phantom RP 200 using the different subnet masks. The unicast routing longest match algorithms always pick the primary RP 205 over the secondary RP 210. The primary RP 205, by announcing a longest match route (that is, a route with a 30 mask for the RP address) will always be preferred over the less specific route being announced by the secondary RP (that is, a 29 for the same rendezvous point address). In the example shown in FIG. 2, the primary RP 205 advertises the 30 route, while the secondary RP 210 advertises a route with a shorter mask (a 29 route that also includes the RP address). As long as both the primary and second RPs 205, 210 are present (both network devices hosting the loopback interfaces are up and available) unicast routing will choose the longest match and converge to the primary RP 205. The secondary RP's advertised route is chosen only when the network device hosting the primary RP 205 goes offline or all of its interfaces go down.

Figure 3:
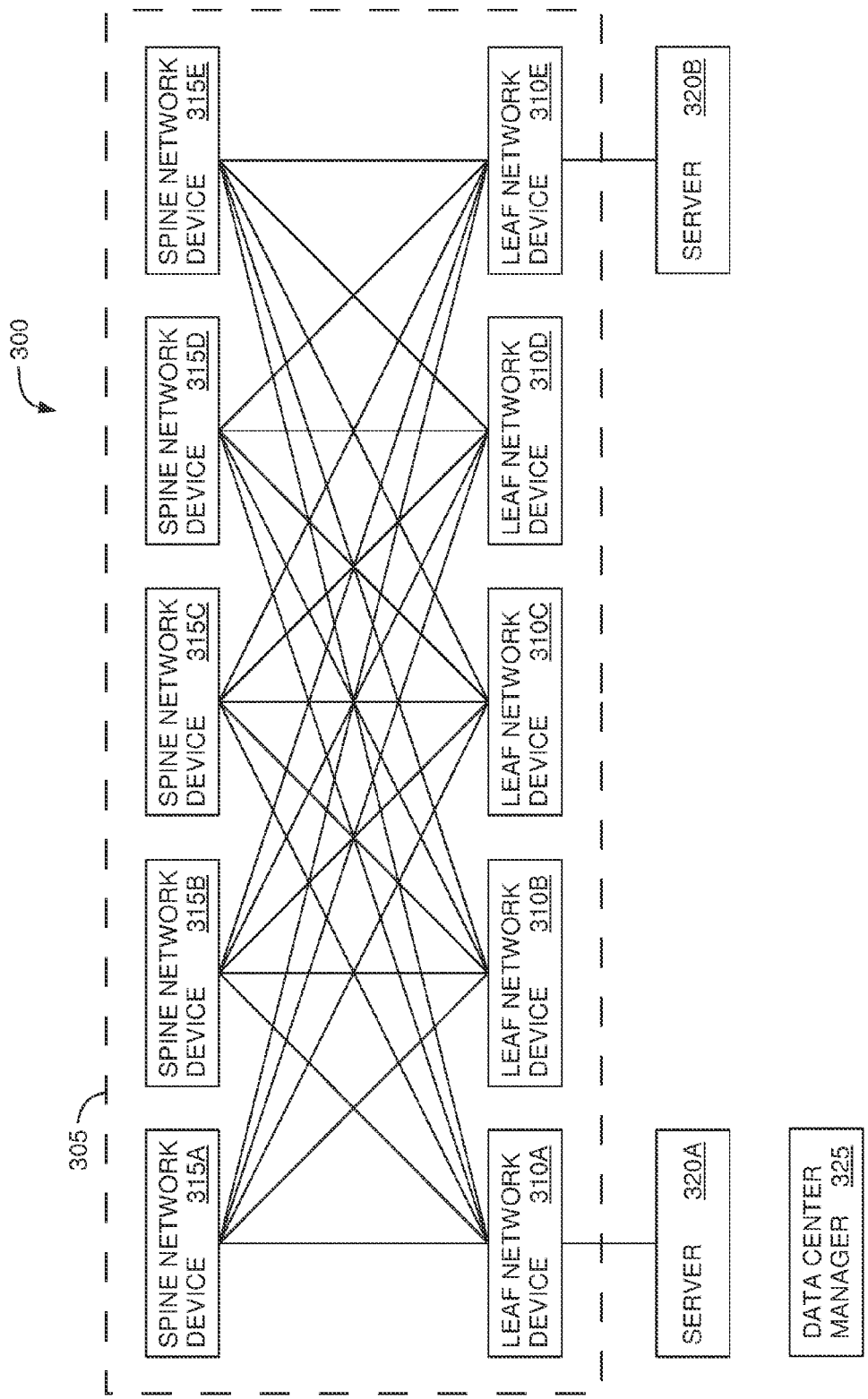
FIG. 3 illustrates a data center with a network fabric, according to one embodiment described herein.

FIG. 3 illustrates a data center 300 with a network fabric 305, according to one embodiment described herein. The data center 300 may include a single physical location (e.g., a building) or multiple buildings at different geographic locations. The data center 300 includes the network fabric 305 used for transferring data between servers 320. As shown, the network fabric 305 includes a spine-leaf architecture where each leaf network device 310 (e.g., a router, switch, hub, etc.) is connected to each one of the spine network devices 315 (e.g., a router, switch, hub, etc.). Although network fabric 305 includes the same number of leaf network devices 310 as spine network devices 315, this is not a requirement as any ratio between the network devices 310 and 315 is conceivable.

In one embodiment, the network fabric 305 uses VXLAN to segregate the data traffic flowing the through the network devices 310, 315. By adding the 24-bit VXLAN header to network traffic, the fabric 305 is able to establish over 16 million different VXLAN segments that can correspond to an equal number of different customers or tenants of the data center 300. Using VXLAN provides more flexibility than some prior versions of VLAN which are limited to approximately 4000 unique VLANs.

When a leaf network device 310 receives a multi-destination frame (e.g., broadcast traffic, multicast traffic, and unicast traffic with an unknown destination) from a server (e.g., server 320A), the leaf network device 310 encapsulates the multi-destination frame into an IP multicast packet and assigns the packet to a multicast group allocated to multi-destination traffic. For example, the leaf device 310 may use some criteria such as which ingress port the frame is received on or the original VLAN the frame is tagged to determine which VXLAN segment the frame belongs. Because each VXLAN segment may be assigned to a particular multicast group, in this manner the leaf network device 310 determines the assigned multicast group. Using the assigned multicast group, the leaf network device 310 then forwards the IP multicast packet to the corresponding RP (e.g., one of the spine network devices 315) which uses a shared tree like the one shown in FIG. 1 to forward the multicast packet to the members of the multicast group (i.e., the recipients). For example, the RP sends the multicast packet to one or more leaf network devices 310 which then reverse the encapsulation process and provide the multi-destination frame to the connected server—e.g., server 320B.

Although FIG. 3 illustrates a network fabric with a spine-leaf architecture, the embodiments described herein are not limited to such. Instead, the techniques discussed herein may apply to any network fabric that uses RPs to route IP multicast data. For example, instead of having only one spine layer, there may be multiple layers (or a hierarchy) of spine network devices, or the spine network devices may be interconnected which may mean the leaf network devices no longer have to connect to every spine network device.

The data center 300 includes a data center manager 325 which configures and manages the network fabric 305. The data center manager 325 provides a central point of management for ease of operation. The manager 325 may be a software application executed on a computing device that includes one or more processors, a hardware element, or a mixture of both software and hardware. In one embodiment, the manager 325 configures the network devices in the fabric 305 in two ways: automatic provisioning—e.g., PowerOn Automatic Provisioning (POAP)—and auto-configuration. Automatic provisioning may use templates that include parameters for configuring the leaf and spine network devices 310, 315 as they are powered on or booted up (e.g., when the network devices are added to the network fabric 305). The data center manager 325 may perform auto-configuration using auto-configuration profiles when at least some of the network devices in the fabric 305 have booted and are currently operating to route traffic between the servers 320. For example, the auto-configuration profiles may be used to optimize the performance of the network fabric 300 during run time to minimize traffic disruptions. Two examples of these auto-configuration profiles will be discussed below in FIGS. 7 and 9.

Figure 4:
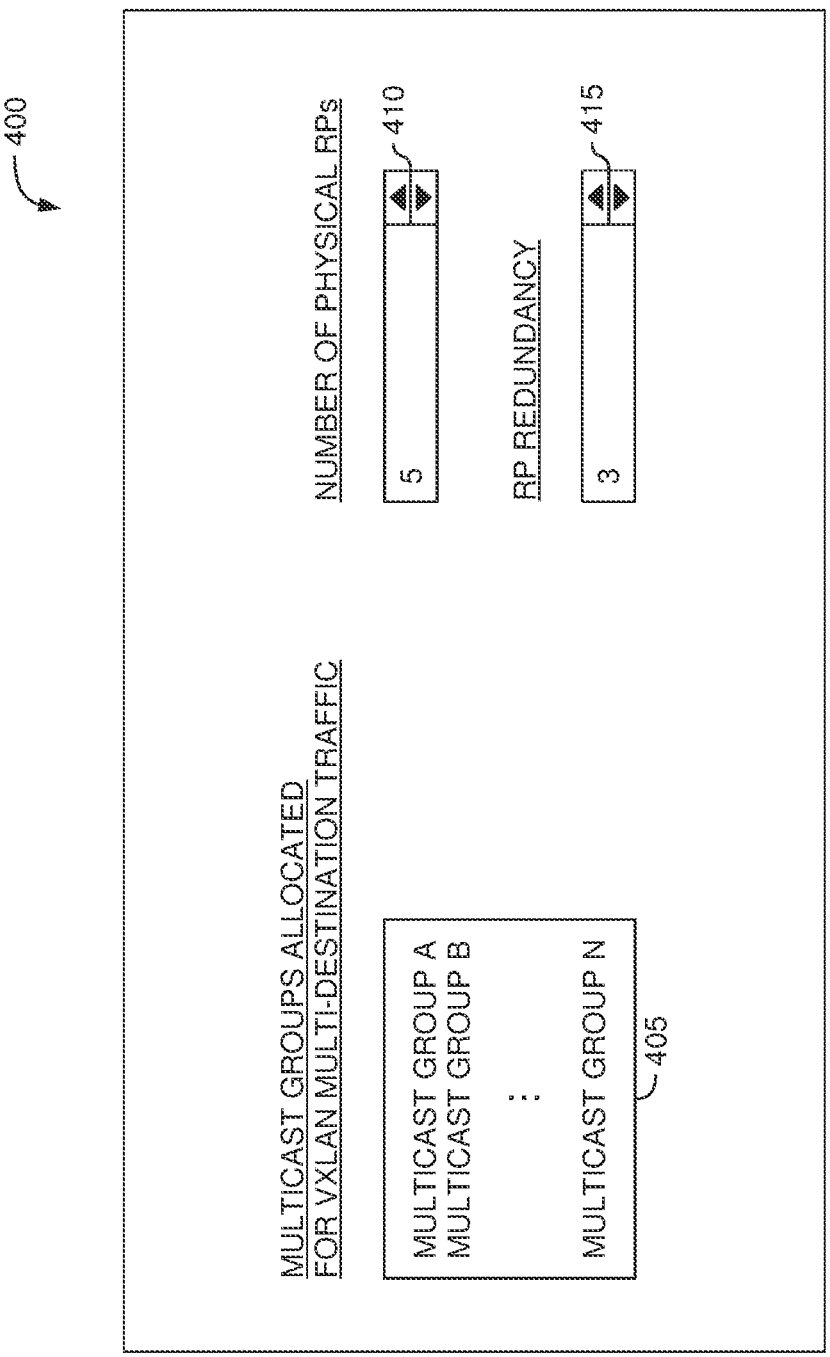
FIG. 4 illustrates a graphic user interface for defining parameters for handling multi-destination traffic in the network fabric, according to one embodiment described herein.

FIG. 4 illustrates a graphic user interface (GUI) 400 for defining parameters for handling multi-destination traffic in the network fabric, according to one embodiment described herein. The GUI 400 may be displayed on any display device such as a monitor associated with a desktop computer, a tablet, laptop, mobile phone, and the like. In one embodiment, the GUI 400 is generated by the data center manager. For example, the data center manager may be an application executing on a computing device that uses the GUI 400 to interact with a system administrator. The system administrator can use an I/O device such as a keyboard, mouse, integrated touch screen, etc. to provide parameter values to the data center manager using GUI 400.

As shown, GUI 400 includes three different regions for receiving each of the parameters—e.g., the multicast group list 405, the number of physical RPs, and the desired RP redundancy. The multicast group list 405 displays the multicast groups allocated for VXLAN multi-destination traffic. As discussed above, when a leaf network device receives multi-destination traffic, it encapsulates the multi-destination traffic into a UDP/IP multicast packet and assigns the packet to a particular multicast group selected from the list 405. The system administrator can control the number of multicast groups used for routing multi-destination traffic by adding, deleting, and/or editing the multicast groups in list 405. To do so, the administrator may select a particular multicast group in the list 405 and edit or delete the group using corresponding buttons (not shown). Similarly, to add a new multicast group, the administrator may select an 'add button' (not shown) which permits the administrator to enter information about the group such as group members, an IP multicast address associated with the group, and the like.

Using I/O element 410, the system administrator sets the number of physical RPs in the network fabric. In one embodiment, the number of physical RPs correlates to the number of phantom RPs in the network fabric—e.g., if the user stipulates five physical RPs then the data center manager establishes five phantom RPs. As shown, the I/O element 410 includes up and down arrows that the administrator uses to adjust the number of physical RPs using, for example, a cursor or a touch interface. In another embodiment, the I/O element 410 permits the system administrator to change the number of physical RPs by typing in the number of desired RPs or using a dropdown menu. Generally, any type of I/O element that permits the system administrator to control the number of physical RPs is contemplated.

Using I/O element 415, the system administrators sets the desired RP redundancy which determines the number of loopback interfaces for each phantom RP. If the loopback interfaces are each located on different physical RPs, then the value shown in the I/O element 415 controls the number of physical RPs that are part of each phantom RP. For example, for 3-way redundancy, each phantom RP has three loopback interfaces which may each be located on three respective physical network devices—i.e., one primary RP and two secondary RPs. In this manner, the value set in I/O element 415 determines how many secondary RPs are used to backup the primary RP in each phantom RP. Although FIG. 4 illustrates that I/O element 415 is the same type as I/O element 410, this is not a requirement. Indeed, I/O element 415 may be any type of I/O element that permits the system administrator to control the RP redundancy.

Figure 5:
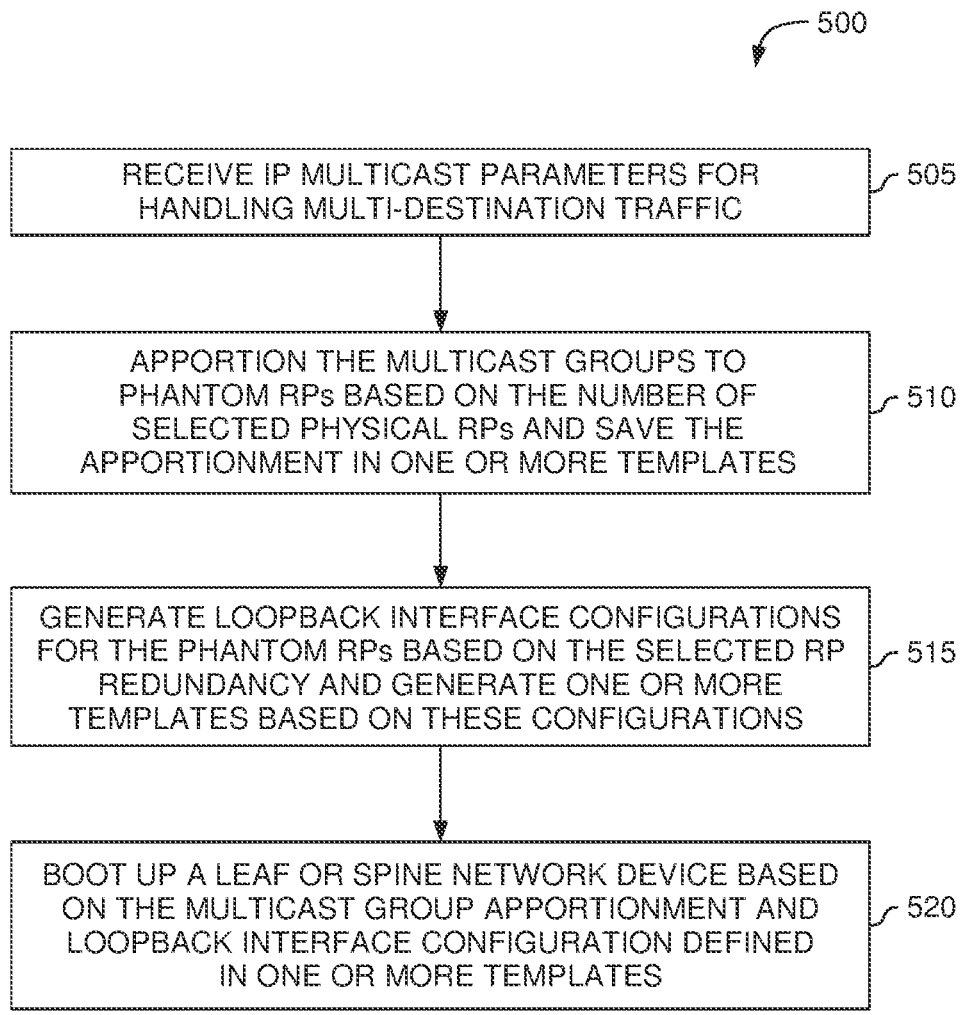
FIG. 5 is a flow chart for booting up network devices based on the defined parameters, according to one embodiment described herein.

FIG. 5 is a flow chart 500 for booting up network devices based on the defined parameters, according to one embodiment described herein. At block 505, the data center manager receives IP multicast parameters for handling multi-destination traffic. In one embodiment, the IP multicast parameters include at least the three parameters that are set using the GUI 400 shown in FIG. 4—i.e., the multicast group list, the number of physical RPs, and the desired RP redundancy.

At block 510, the data center manager apportions the multicast groups allocated to the multi-destination traffic to the phantom RPs. That is, the data center manager determines the total number of multicast groups in the list received at block 505 and divides the total by the number of phantom RPs. As discussed above, the number of phantom RPs may be set by the number of physical RPs designated by the system administrator. For example, if the system administrator allocates 100 multicast groups to multi-destination traffic and designates five physical network devices to serve as five physical RPs, then the data center manager assigns twenty multicast groups to each of the phantom RPs. In one embodiment, the data center manager decides which of five network devices in the data center will be used as the RPs, but in other embodiments the network devices selected as the five physical RPs may be designated by the system administrator.

In one embodiment, the assignment of multicast groups to phantom RPs is provided to the leaf network devices so that these network devices know which RP should receive the IP multicast packet based on its associated group. That is, the multicast group to which the IP multicast packet belongs determines which phantom RP of a plurality of phantom RPs receives the IP multicast packet. By dividing the multicast groups amongst the phantom RPs, the data center manager is able to spread out (e.g., load balance) the task of forwarding the multi-destination traffic among several different physical RPs.

In one embodiment, the data center manager generates one or more scripts that partitions the multicast groups into subsets based on the number of phantom RPs (e.g., five subsets). Furthermore, the data center manager may also generate a template for configuring the leaf network devices that stipulates which subset is assigned to which phantom RP. For example, assuming the phantom RPs are assigned the IP addresses 1.1.1.2, 1.2.1.2, 1.3.1.2, 1.4.1.2, and 1.5.1.2, respectively, the template informs the network device which of the five subsets is assigned to which one of the phantom RPs. As will be discussed in more detail below, the data center manager may use the template when a network device is booted to configure the network device to handle the multi-destination traffic using the bidir-PIM protocol.

At block 515, the data center manager generates loopback interface configurations for the network devices associated with the phantom RPs. As discussed above, the number of loopback interfaces for each phantom RP is based on the RP redundancy value provided by the system administrator. For example, if 3-way RP redundancy is desired, the data center manager generates three loopback interfaces for each phantom RP—one interface for the primary RP and two interfaces for the two secondary RPs.

FIG. 6 illustrates a network fabric configuration chart 600 that includes multiple phantom RP, according to one embodiment described herein. Specifically, FIG. 6 illustrates assigning loopback interfaces to physical RPs (e.g., physical network devices) based on the desired RP redundancy. The top row of chart 600 lists the number of phantom RPs in the network fabric and their associated IP address. The leftmost column of chart 600 lists the number of physical RPs designated by the system administrator. In this example, the number of physical RPs (i.e., network devices) and the number of phantom RPs is the same. That is, in this illustrated algorithm, the data center manager creates a M×M table where the number of rows and columns (M) is determined by the number of physical RPs designated by the system administrator.

The interior of chart 600 lists the loopback interfaces for the phantom RPs and for the physical RPs. To achieve 3-way redundancy, each spine network device 315 is assigned three loopback interfaces. For example, spine network device 315A is assigned a loopback interface for phantom RP 1.1.1.2, phantom RP 1.2.1.2, and phantom RP 1.3.1.2. As such, spine network device 315A is a primary RP for phantom RP 1.1.1.2, a secondary RP for phantom RP 1.2.1.2, and a secondary RP for phantom RP 1.3.1.2. Each phantom RP includes three loopback interfaces that are hosted by three different spine network devices—one primary RP and two secondary RPs. To establish a priority between the loopback interfaces (e.g., which physical RP is a primary and which are secondary), the data center manager assigns different subnet masks to the IP addresses of the loopback interfaces. As discussed previously, the primary and secondary RPs advertise routes for the phantom RP using different subnet masks. According to unicast routing longest match route lookups, the route with the longest mask is the one selected to reach the phantom RP. As such, the data center manager assigns each loopback interface for the phantom RPs with a different length mask based on which spine network device 315 the manager wants to be the primary RP and which it wants to be the secondary RP.

As shown in chart 600, each phantom RP has three loopback interfaces with different subnet mask lengths—i.e., 29, 28, and 27. Because the loopback interface with the 29 mask is the longest, the network device on which the loopback interface is hosted is the primary RP. The loopback interface with the 28 mask is located on a secondary RP which serves as the direct backup for the primary RP. That is, if the primary RP fails (e.g., no longer advertises the IP address of the loopback interface), the leaf network devices instead send the IP multicast packets assigned to that phantom RP to the second RP with the mask value of 28 (a process referred to herein as converging). Furthermore, the loopback interface with the 27 mask is located on another secondary RP that serves as a backup to the secondary RP with the 28 mask. Thus, if both RPs with the 29 and 28 masks fail, the leaf network devices instead send IP multicast packets to the secondary RP advertising the 27 mask. As such, for phantom RP 1.1.1.2, spine network device 315A is the primary RP, spine network device 315E is a secondary RP that directly backs up spine network device 315A, and spine network 315D is a secondary RP that directly backs up spine network device 315E.

Stated differently, in the illustrated embodiment, the data center manager uses the desired redundancy (N) designated by the system administrator to assign the mask lengths. For example, in the first row, starting at mask length 29, the data center manager assigns the mask length in each column until mask length (30-N) is length. In chart 600, because N is 3, three columns are assigned mask lengths 29, 28, and 27. Continuing the algorithm for the subsequent rows, the data center manager assigns the same three mask lengths but shifted one column to the right. If the last column is reached, the remaining mask lengths go back to the first column which occurs in rows 4 and 5 of chart 600. Based on using this algorithm to assign the loopback interfaces to the network devices 315, the data center manager may then generate templates that can be used to configure the network devices 315 when these devices are booted up or added to the network fabric.

Chart 600 illustrates just one suitable pattern that the data center manager may use to assign the physical RPs as primary and secondary RPs for the phantom RPs. In one embodiment, the pattern may be any suitable pattern that satisfies the parameters provided by the system administrator—e.g., five physical RPs are used to form phantom RPs with 3-way redundancy. Furthermore, the pattern may assign the loopback interfaces evenly so that each physical network devices has the same number of loopback interfaces, but this is not a requirement. In another embodiment, the network devices may not all have the same hardware or software capabilities. In such a scenario, it may be desired to have the network device with the most compute resources be a primary RP for multiple phantom RPs. For example, spine network device 315A may be the primary RP from both phantom RP 1.1.1.2 and 1.2.1.2 (e.g., device 315A is assigned loopback interface 1.2.1.1 with mask=29 instead of loopback interface 1.2.1.1 with mask=28 as shown) while spine network device 315B is a secondary RP for both of these phantom RPs (e.g., device 315B is assigned loopback interface 1.2.1.1 with mask=28 instead of loopback interface 1.2.1.1 with mask=29 as shown).

Of course, if the parameters provided by the system administrator change, the assignment of loopback interfaces shown in chart 600 may also change. For example, if four-way redundancy is desired, each of the physical RPs may be assigned four loopback interfaces rather than three. If the system administrator requests only four physical RPs, then the data center manager creates four phantom RPs whose loopback interfaces are hosted on four network devices. However, it is possible to have unequal numbers of phantom RPs and physical RPs. If there are more phantom RPs than physical RPs, then one physical RP will serve as a primary RP for multiple phantom RPs. If there are more physical RPs than phantom RPs, then not every physical RP will be a primary RP.

Although chart 600 illustrates using spine network devices 315 as the physical RPs, this is not a requirement. For example, the leaf network devices (or a combination of both leaf and spine network devices) may be used as the physical RPs. Also, not every spine network device in the network fabric must be a RP. For instance, chart 600 illustrates that the 5 spine network devices shown in FIG. 2 are all used as primary and secondary RPs, but this is not a requirement. For example, the network fabric may include hundreds of spine network devices 315 but only five of those devices are used as RPs for handling the IP multicast packets.

Returning to block 515 of method 500, the data center manager may save the loopback interface assignments in templates that are used when booting the network devices in the fabric. At block 520, when booting, the spine network devices selected as physical RPs configure loopback interfaces with the appropriate IP addresses and subnet masks using the interfaces generated at block 510 and/or block 515. These RPs then begin to advertise routes associated with the loopback interfaces based on the respective IP addresses. Moreover, using the templates generated at block 510 and/or block 515, the leaf network devices may generate routing information when booting for forwarding the multi-destination traffic encapsulated in IP multicast packets to the appropriate RP. As shown by flow chart 500, the data center manager uses the parameters provided by the system administrator to generate templates that are used to configure the network devices and enable IP multicast packet routing in the network fabric—e.g., a VXLAN environment.

Figure 7:
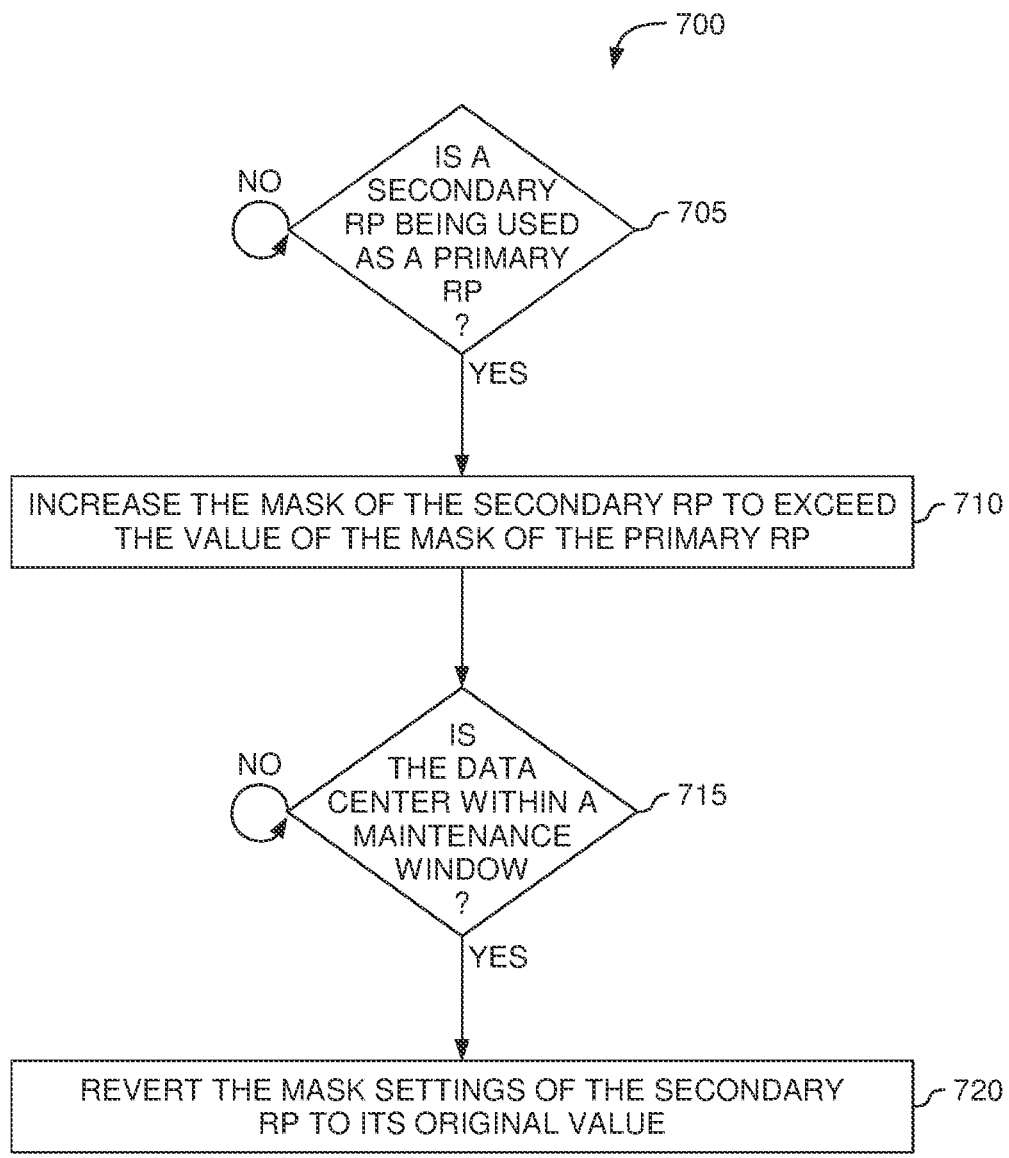
FIG. 7 is a flow chart for dynamically changing a mask value of a loopback interface on a physical rendezvous point, according to one embodiment described herein.

FIG. 7 is a flow chart 700 for dynamically changing a mask value of a loopback interface on a physical RP, according to one embodiment described herein. That is, unlike the flow chart 500 shown in FIG. 5 which may be performed before a network device has been configured (e.g., booted up), flow chart 700 occurs when the network devices are operating and forwarding the multi-destination traffic. At block 705, the data center manager determines if a secondary RP is being used as a primary RP. As discussed earlier, both the primary RP and the secondary RP(s) advertise the routes corresponding to their loopback interfaces. When the primary RP fails (e.g., the route is no longer advertised), the leaf network devices which receive the multi-destination traffic automatically begin forwarding the traffic to the secondary RP with the next longest subnet mask. Although this occurs automatically, a failure in the primary RP nonetheless causes a traffic disruption that may last several seconds before the multi-destination traffic converges onto the secondary RP.

If the failed primary RP comes back online (e.g., after a system or application in the network device is restarted) and begins to again advertise the route of the corresponding loopback interface, because its loopback interface has the longest subnet mask, the leaf network devices will then automatically start sending the multi-destination traffic back to the original primary RP. This switch from the secondary RP back to the original primary RP causes yet another traffic disruption.

To prevent this second traffic disruption, once the first traffic disruption is detected (e.g., data center manager determines that a secondary RP is acting as the primary RP) at block 710 the data center manager increases the mask of the secondary RP to exceed the value of the mask of the primary RP. Now, the route advertised by the secondary RP has the longest subnet mask, and thus, its route is selected by the leaf network devices even if the original primary RP comes back online and begins advertising the route of its loopback interface.

FIG. 8 illustrates a network fabric configuration in chart 800 that includes a changed mask value to prevent the second traffic disruption. In chart 800, the spine network device 315A fails (causing a first traffic disruption) and ceases to advertise the route corresponding to loopback interface 1.1.1.1 with mask=29. In response, the leaf network devices automatically converge to the loopback interface 1.1.1.1 with mask=28 on spine network device 315E. That is, when an IP multicast packet has a multicast group ID assigned to phantom RP 1.1.1.2, the network device that received the packet forwards it to spine network device 315E instead of spine network device 315A. To prevent a second disruption that may occur if spine network device 315A comes back online, the data center manager increases the mask value 810 of the loopback interface 1.1.1.1 on spine network device 315E from 28 to 30. Thus, even if spine network device 315A recovers from its failure and again beings advertising the route associated with the loopback interface 1.1.1.1, the subnet mask has a length shorter than 30, and thus, the network devices do not reconverge back to spine network device 315A and the second traffic disruption is avoided. Of course, the same result would occur if the data center manager reduced the mask value of the loopback interface of device 315A to a value less than 28 such as 26.

Returning to flow chart 700, at block 715 the manager determines whether the network fabric is within a maintenance window. For example, the data center may set aside a certain part of the day (e.g., early in the morning or late at night) for performing maintenance operations when network traffic is at a minimum and traffic disruptions will be less harmful to customers. Alternatively, the data center manager may identify a maintenance window based on measuring current analytics associated with the data center. Regardless of the technique used to identify a maintenance window, at block 720, the data center manger reverts the mask settings of the secondary RP to its original value—e.g., changes the subnet mask length back to 28—during the maintenance window. Once the spine network device 315E begins to advertise routes with the original subnet mask length that is less than the mask length of device 315A, the leaf network devices reconverge to the loopback interface on spine network device 315A. Although this may cause a minor traffic disruption, because it occurs during a maintenance window, any negative effects are ameliorated. Moreover, reverting the mask settings back to their original values even if doing so causes a minor traffic disruption may provide better load balancing since spine network device 315E no longer serves as the primary RP for two different phantom RPs (i.e., phantom RPs 1.1.1.2 and 1.5.1.2).

Figure 9:
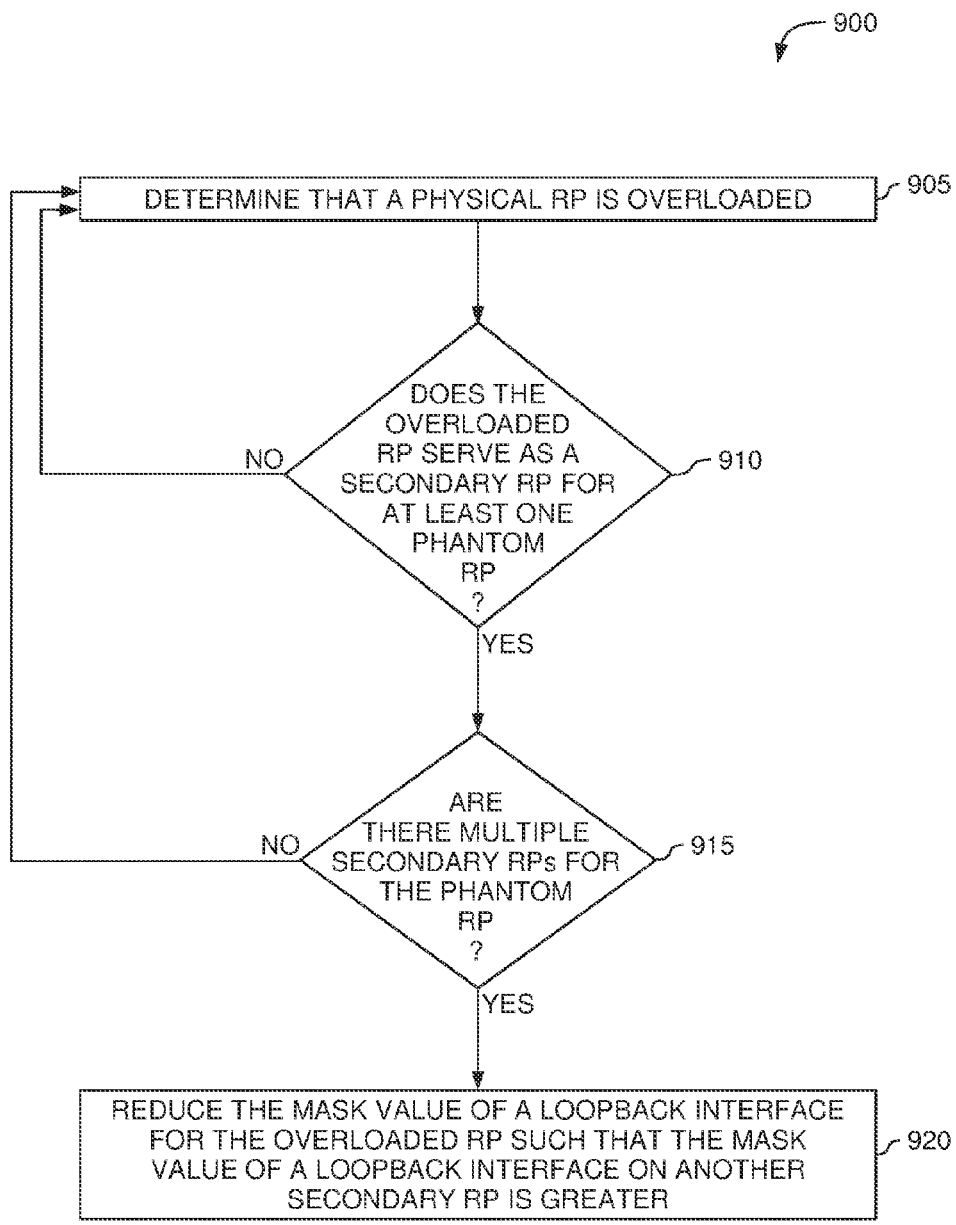
FIG. 9 is a flow chart for dynamically changing a mask value of a loopback interface for an overloaded rendezvous point, according to one embodiment described herein.

FIG. 9 is a flow chart 900 for dynamically changing a mask value of a loopback interface for an overloaded RP, according to one embodiment described herein. Like flow chart 700, flow chart 900 may occur when the network devices are operating and forwarding the multi-destination traffic. At block 905, the data center manager determines that a physical RP is overloaded. In one embodiment, the physical RP sends an alert to the manager which informs the manager that the network device is either unable to keep up with tasks or may soon be unable to perform all its tasks. A physical RP may use various indicators to determine if it is overloaded. For example, the RP may evaluate buffer utilization, the rate at which data packets flow in and out of the RP, processor utilization, overheating, and the like to determine if the RP is overloaded. Alternatively, instead of the RP sending an alert, the data center manager may monitor these different indicators to determine if the RP is overloaded.

Upon determining one of the physical RPs is overloaded, at block 910, the data center manager determines if the overloaded RP is assigned as a secondary RP for at least one phantom RP. If so, at block 915, the data center manager determines whether there are multiple secondary RPs for the phantom RP. That is, the data center manager determines if the phantom RP has multiple backup RPs for the primary RP. If so, at block 920, the data center manager reduces the mask value of the loopback interface for the overloaded RP such that the mask value of a loopback interface on another secondary RP is greater. This is shown graphically by comparing chart 600 of FIG. 6 with chart 1000 in FIG. 10.

FIG. 10 illustrates the network fabric configuration chart 1000 that includes a changed mask value for an overloaded RP. As shown, the spine network device 315E is identified as the overloaded RP 1005. In response, the data center manager changes the mask values 1010 and 1015 relative to the mask values shown in chart 600 of FIG. 6. Specifically, the data center manager decreased the mask value 1010 of the overloaded RP 315E from 28 to 27 and increased the mask value 1015 of spine network device 315D from 27 to 28. Doing so does not cause a traffic disruption since the loopback interface with the longest subnet remains the same—i.e., the multicast packets are still transmitted to spine network device 315A since it is the primary RP. Essentially, the loopback interfaces of the spine network devices 315D and 315E switch priority states. That is, instead of spine network device 315E being the direct backup to the primary RP (i.e., spine network device 315A), now spine network device 315D is the direct backup. As such, if spine network device 315A fails and no longer advertises the route for loopback interface 1.1.1.1 with mask=29, the leaf network device automatically converge to the loopback interface 1.1.1.1 with mask=28 on spine network device 315D rather than the loopback interface on spine network device 315E. By doing so, the data center manager decreases the likelihood that spine network device 315E will be promoted to the primary RP for phantom RP 1.1.1.2 which would further overload the device 315E and may disrupt traffic. Instead, network device 315E becomes the primary RP for phantom RP 1.1.1.2 only if the loopback interfaces on both spine network devices 315A and 315D cease advertising their routes.

In one embodiment, multiple loopback interfaces of the overloaded RP 1005 may have their masked values decreased. For example, assume instead of a three-way redundancy as shown in chart 1000, the network fabric established a four-way redundancy where each spine network device 315 is a primary RP for one phantom RP and a secondary RP for three phantom RPs. Using the scenario established in chart 1000, the data center manager may change the mask values of two of the loopback interfaces on the spine network device 315E to ensure the loopback interfaces are the lowest priority interfaces for the phantom RPs. Thus, the spine network device 315E would become the primary RP only if the primary RP and both secondary RPs ceased advertising their routes.

In another embodiment, the mask value for the loopback interface that serves as the primary RP on the overloaded RP 1005 may be decreased, even if this results in a traffic disruption. For example, if the overloaded RP 1005 is constantly causing a traffic disruption, the data center manager may decide to demote the loopback interface that serves as the primary RP to a secondary RP. In this case, the manger would decrease the loopback interface 1.5.1.1 subnet mask for spine network device 315E from 29 to 28 or 27. Contemporaneously, the data center manager may increase the loopback interface 1.5.1.1 masks on spine network device 315D and/or spine network device 315C. For instance, the manager may increase the loopback interface 1.5.1.1 mask on spine network device 315D from 28 to 29 and the loopback interface 1.5.1.1 mask on spine network device 315C from 27 to 28. Although this will cause a traffic disruption as the leaf network devices converge onto the loopback interface 1.5.1.1. on spine network device 315D, this may be preferred over permitting spine network device 315E to continue to operate as a primary RP for phantom 1.5.1.2 in its overloaded state.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may send information to the data center and network fabric discussed above which are part of the cloud.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for generating one or more templates for configuring a network device in a network fabric, the method comprising:
receiving parameters for configuring phantom rendezvous points (RPs) in the network fabric;
apportioning a plurality of multicast groups among the phantom RPs;
establishing, based on the parameters, at least one primary RP and secondary RP for each of the phantom RPs using different values for respective subnet masks; and
generating, by one or more processors, the one or more templates based on the apportioning and establishing, wherein the one or more templates configure the network device to perform multicast packet routing when the network device is added to the network fabric.

2. The method of claim 1, wherein the parameters comprise a list of the plurality of multicast groups, a number of physical RPs, and an RP redundancy value.

3. The method of claim 2, further comprising providing a graphical user interface comprising a respective I/O element for each of the parameters, wherein the I/O elements are interactive to permit a user to set a respective value for each of the parameters.

4. The method of claim 1, wherein the one or more templates configure the network device to perform bidirectional protocol independent multicast routing in a VXLAN environment where multi-destination traffic in the network fabric is encapsulated into an IP multicast packet.

5. The method of claim 1, further comprising, after configuring the network device using the one or more templates:
upon identifying a failure of the primary RP for at least one of the phantom RPs, changing a value of at least one subnet mask such that a mask value of the secondary RP for the at least one of the phantom RPs is greater than a mask value of the primary RP for the at least one of the phantom RPs.

6. The method of claim 1, wherein at least one of the phantom RPs has a first secondary RP and a second secondary RP, the method further comprising, after configuring the network device using the one or more templates:
upon determining that a first network device hosting the first secondary RP in the network fabric is overloaded, changing a value of at least one subnet mask such that a mask value of the first secondary RP hosted on the first network device is less than a mask value of the second secondary RP hosted on a second network device in the network fabric.

7. A computer program product for generating one or more templates for configuring a network device in a network fabric, the computer program product comprising:
computer code that receives parameters for configuring phantom rendezvous points (RPs) in the network fabric;
computer code that apportions a plurality of multicast groups among the phantom RPs;
computer code that establishes, based on the parameters, at least one primary RP and secondary RP for each of the phantom RPs using different values for respective subnet masks;
computer code that generates the one or more templates based on the apportioning and establishing, the one or more templates configure the network device to perform multicast packet routing when the network device is added to the network fabric; and
a non-transitory computer readable storage medium that stores the computer.

8. The computer program product of claim 7, wherein the parameters comprise a list of the plurality of multicast groups, a number of physical RPs, and an RP redundancy value.

9. The computer program product of claim 8, further comprising computer code that provides a graphical user interface comprising a respective I/O element for each of the parameters, wherein the I/O elements are interactive to permit a user to set a respective value for each of the parameters.

10. The computer program product of claim 7, wherein the one or more templates configure the network device to perform bidirectional protocol independent multicast routing in a VXLAN environment where multi-destination traffic in the network fabric is encapsulated into an IP multicast packet.

11. The computer program product of claim 7, further comprising computer code that, after the network device is configured using the one or more templates and upon identifying a failure of the primary RP for at least one of the phantom RPs, changes a value of at least one subnet mask such that a mask value of the secondary RP for the at least one of the phantom RPs is greater than a mask value of the primary RP for the at least one of the phantom RPs.

12. The computer program product of claim 7, wherein at least one phantom RP has a first secondary RP and a second secondary RP, the computer program product further comprising:
    computer code that, after network device is configured using the one or more templates and upon determining that a first network device hosting the first secondary RP in the network fabric is overloaded, changes a value of at least one subnet mask such that a mask value of the first secondary RP hosted on the overloaded network device is less than a mask value of the second secondary RP hosted on a second network device in the network fabric.

13. A method for establishing multicast packet routing in a network fabric, the method comprising:
    configuring, using one or more templates, a plurality of network devices to perform multicast packet routing when the network devices are added to the network fabric, the templates are based on parameters for establishing phantom rendezvous points (RPs) in the network fabric,
    wherein after configuring the plurality of network devices using the one or more templates, a plurality of multicast groups are apportioned among the phantom RPs and each phantom RP has a primary RP and a secondary RP based on different values of respective subnet masks and wherein at least one of the phantom RPs has a first secondary RP and a second secondary RP;
    receiving multi-destination traffic in the network fabric;
    forwarding the multi-destination traffic to at least one primary RP based on a multicast group assigned to the multi-destination traffic; and
    upon determining that a first network device hosting the first secondary RP in the network fabric is overloaded, changing a value of at least one subnet mask such that a mask value of the first secondary RP hosted on the first network device is less than a mask value of the second secondary RP hosted on a second network device in the network fabric.

14. The method of claim 13, wherein the parameters comprise a list of the plurality of multicast groups, a number of physical RPs, and an RP redundancy value.

15. The method of claim 13, wherein the one or more templates configure the plurality of network devices to perform bidirectional protocol independent multicast routing in a VXLAN environment where multi-destination traffic in the network fabric is encapsulated into an IP multicast packet.

16. The method of claim 15, further comprising, before forwarding the multi-destination traffic:
    encapsulating the multi-destination traffic into the IP multicast packet at one of the plurality of network devices that received the multi-destination traffic; and
    assigning the IP multicast packet to one of the plurality multicast groups.

17. The method of claim 15, wherein the multi-destination traffic comprises at least one of broadcast traffic, multicast traffic, and unicast traffic with an unknown destination in the network fabric.

18. The method of claim 13, further comprising, after the multi-destination traffic is received at the at least one primary RP, forwarding the multi-destination traffic using a shared tree to one or more recipients of the multi-destination traffic.

19. The method of claim 13, further comprising, upon identifying a failure of the primary RP for at least one of the phantom RPs, changing a value of at least one subnet mask such that a mask value of the secondary RP is greater than a mask value of the primary RP.

* * * * *

UNITED STATES PATENT AND TRADEMARK OFFICE
CERTIFICATE OF CORRECTION

PATENT NO. : 9,559,854 B2  Page 1 of 1
APPLICATION NO. : 14/312347
DATED : January 31, 2017
INVENTOR(S) : Liqin Dong et al.

It is certified that error appears in the above-identified patent and that said Letters Patent is hereby corrected as shown below:

On the Title Page

In item (56), in Column 2, under "Other Publications", Line 3, delete "CICSO," and insert -- CISCO, --, therefor.

In item (57), in Column 2, in "Abstract", Line 2, delete "us" and insert -- use --, therefor.

In the Claims

In Column 16, Line 63, in Claim 7, delete "computer." and insert -- computer codes. --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*